United States Patent
Corfias Zuccalli et al.

(10) Patent No.: US 12,410,269 B2
(45) Date of Patent: Sep. 9, 2025

(54) AQUEOUS COATING COMPOSITION

(71) Applicant: COATEX, Genay (FR)

(72) Inventors: Catherine Corfias Zuccalli, Villeurbanne (FR); Laurie Parrenin, Villeneuve (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 753 days.

(21) Appl. No.: 17/626,931

(22) PCT Filed: Jul. 15, 2020

(86) PCT No.: PCT/FR2020/000205
§ 371 (c)(1),
(2) Date: Jan. 13, 2022

(87) PCT Pub. No.: WO2021/009418
PCT Pub. Date: Jan. 21, 2021

(65) Prior Publication Data
US 2022/0259346 A1    Aug. 18, 2022

(30) Foreign Application Priority Data

Jul. 18, 2019  (FR) .................................... 19 08124

(51) Int. Cl.
| | | |
|---|---|---|
| *C09D 133/02* | (2006.01) | |
| *C08F 220/12* | (2006.01) | |
| *C09D 133/06* | (2006.01) | |
| *C09D 133/08* | (2006.01) | |
| *C09D 133/14* | (2006.01) | |
| *C08K 3/26* | (2006.01) | |

(52) U.S. Cl.
CPC .......... *C08F 220/12* (2013.01); *C09D 133/02* (2013.01); *C09D 133/06* (2013.01); *C09D 133/08* (2013.01); *C09D 133/14* (2013.01); *C08K 3/26* (2013.01); *C08K 2003/265* (2013.01)

(58) Field of Classification Search
None
See application file for complete search history.

(56) References Cited

U.S. PATENT DOCUMENTS

| 6,296,698 B1 | 10/2001 | Naramoto et al. |
| 11,661,705 B2 * | 5/2023 | Bony .................... C09D 171/02 |
| | | 162/164.3 |
| 2004/0225093 A1 | 11/2004 | Tomita et al. |
| 2011/0319561 A1 * | 12/2011 | Suau ..................... A61Q 19/00 |
| | | 977/773 |
| 2015/0094398 A1 * | 4/2015 | Carchidi ............ C09D 133/064 |
| | | 524/521 |

FOREIGN PATENT DOCUMENTS

| EP | 1 466 930 A2 | 10/2004 |
| EP | 2 853 570 A1 | 4/2015 |
| WO | WO 2011/161508 A1 | 12/2011 |

OTHER PUBLICATIONS

International Search Report mailed on Oct. 23, 2020 in PCT/FR2020/000205 filed on Jul. 15, 2020 (3 pages).

* cited by examiner

*Primary Examiner* — Richard A. Huhn
(74) *Attorney, Agent, or Firm* — Oblon, McClelland, Maier & Neustadt, L.L.P.

(57) ABSTRACT

A composition suitable for preparing a coating, such as a paint or a varnish, may include an acrylic acid copolymer thickener, a polymer binder chosen from a vinyl acetate homopolymer, a vinyl acetate copolymer, a vinyl versatate homopolymer, a vinyl versatate copolymer and combinations thereof, and water. A composition including the acrylic acid copolymer and such a polymer binder may be used in an aqueous coating composition in order to improve the stability of same during storage.

20 Claims, No Drawings

AQUEOUS COATING COMPOSITION

CROSS-REFERENCE TO RELATED APPLICATIONS

The present application is the national stage of international application PCT/FR2020/000205, filed on Jul. 15, 2020, and claims the benefit of the filing date of French Appl. No. 19 08124, filed on Jul. 18, 2019, the content of each of which is incorporated by reference.

The invention relates to a composition for the preparation of a coating, such as a paint or a varnish, comprising a thickening acrylic acid copolymer, a binding polymer chosen among a vinyl acetate homopolymer, a vinyl acetate copolymer, a vinyl versatate homopolymer, a vinyl versatate copolymer and combinations thereof, and water. The invention also relates to the use of the acrylic acid copolymer in an aqueous coating composition comprising such a binding polymer to improve stability during storage. The copolymer of the composition according to the invention makes it possible to improve stability when storing aqueous coating compositions comprising a binder chosen among a vinyl acetate homopolymer, a vinyl acetate copolymer, a vinyl versatate homopolymer, a vinyl versatate copolymer and combinations thereof.

Many aqueous vinyl acetate or vinyl versatate binder-based coating compositions use rheology-modifying thickeners that make it possible to give the compositions the desired rheological properties over a wide range of shear rates. These thickeners may be cellulosic polymers such as hydroxyethyl cellulose (HEC), hydroxymethyl ethyl cellulose (HMEC) and hydrophobically modified HEC (HMHEC), associative thickeners of the HEUR type (Hydrophobically modified Ethylene oxide URethane), associative thickeners of the HASE type (Hydrophobically modified Alkali Soluble Emulsion). HEUR rheology modifiers have the drawback of being too expensive. HASE thickeners are an attractive, low-cost alternative to HEC.

The compatibility of the various constituents in an aqueous coating composition must also be considered. It is especially important for the thickening copolymer and the binder used to have good compatibility, in particular to ensure stability during the storage of the coating composition.

Polymeric agents used as thickening agents do not always provide a satisfactory solution to these different problems.

There is thus a need to have improved thickening agents to provide aqueous coating compositions comprising a binder chosen among a vinyl acetate homopolymer, a vinyl acetate copolymer, a vinyl versatate homopolymer, a vinyl versatate copolymer and combinations thereof.

Moreover, and particularly for environmental reasons, there is also a great need for compositions comprising little or no methacrylic acid, while offering sustained or improved performance compared to the known compositions. Indeed, the use of methacrylic acid, particularly methacrylic acid predominantly prepared from acetone cyanohydrin, which is a highly toxic compound, should be limited as far as possible. Document EP 2853570 describes a composition comprising a vinyl acetate copolymer and a HASE thickener prepared with ethyl acrylate, methacrylic acid, acrylic acid and a hydrophobic macromonomer. Document WO 2011/161508 describes alkali-swellable thickening emulsions prepared with 2-acrylamido-2-methylpropane sulphonic acid and in the absence of surfactant. Document EP 1466930 discloses a cement dispersant prepared with a polycarboxylic acid and document U.S. Pat. No. 6,296,698 describes an admixture for cement comprising a copolymer obtained by polymerisation of N-vinylacetamide.

The composition according to the invention provides a solution to all or part of the problems of the compositions in the prior art.

Thus, the invention provides a composition for the preparation of a coating comprising:

A) at least one copolymer A prepared by polymerisation reaction:
of at least one monomer (a1-1) chosen among acrylic acid and salts thereof;
of from 0 to less than 15% by weight, relative to the total weight of the monomers, of a monomer (a1-2) chosen among methacrylic acid and salts thereof, and in a [monomer (a1-1)]/[monomer (a1-1)+monomer (a1-2)] weight ratio strictly greater than 0.65;
of at least one monomer (a2) that is an ester of an acid chosen among acrylic acid, methacrylic acid, itaconic acid and combinations thereof;
of at least one hydrophobic monomer (a3) of formula (I):

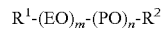

$$R^1\text{-}(EO)_m\text{-}(PO)_n\text{-}R^2 \qquad (1)$$

wherein:
m and n, identical or different, independently represent 0 or an integer or decimal, advantageously an integer, less than 150, the sum m+n ranging from 5 to 150,
EO represents a $CH_2CH_2O$ group,
PO independently represents a group chosen among $CH(CH_3)CH_2O$ and $CH_2CH(CH_3)O$,
$R^1$ represents a group comprising at least one polymerisable olefin unsaturation,
$R^2$ independently represents a straight, branched or cyclic, saturated, unsaturated or aromatic hydrocarbon group comprising from 6 to 40 carbon atoms;
of at least one monomer (a4) chosen among 2-acrylamido-2-methylpropane sulphonic acid, 2-sulphoethyl methacrylate, sodium methallyl sulphonate, styrene sulphonate, their salts and combinations thereof;
B) at least one binding polymer B chosen among a vinyl acetate homopolymer, a vinyl acetate copolymer, a vinyl versatate homopolymer, a vinyl versatate copolymer and combinations thereof and
C) water.

The copolymer A according to the invention is prepared by polymerisation of at least one monomer (a1) comprising a monocarboxylic acid group which are monomers (a1-1) and (a1-2). Preferably according to the invention, the monomer comprising a monocarboxylic acid group is exclusively chosen among monomers (a1-1) and (a1-2).

Monomer (a1-1) is chosen among acrylic acid and salts thereof, in particular an ammonium salt, an amine salt, alkaline salts, such as its sodium salts, potassium salts. Preferably according to the invention, monomer (a1-1) is acrylic acid.

Preferably according to the invention, the polymerisation reaction for the preparation of the copolymer A uses less than 10%, preferably less than 6%, more preferentially less than 5%, much more preferentially less than 2% or less than 1.5% by weight of monomer (a1-2) relative to the total weight of the monomers.

Particularly preferably, the polymerisation reaction for the preparation of the copolymer A does not use a monomer (a1-2). Thus, preferably according to the invention, the monomer comprising a monocarboxylic acid group is exclusively monomer (a1-1).

Preferably according to the invention, the [monomer (a1-1)]/[monomer (a1-1)+monomer (a1-2)] weight ratio is strictly greater than 0.70, preferentially greater than 0.75, preferably greater than 0.80, more preferentially greater than 0.90, even more preferentially greater than 0.95.

The copolymer A according to the invention is prepared by polymerisation of at least one monomer (a2) which is an ester of an acid chosen among acrylic acid, methacrylic acid, itaconic acid and combinations thereof.

The preferred monomer (a2) according to the invention is chosen among alkyl acrylate, in particular $C_1$-$C_{10}$ alkyl acrylate, preferentially $C_1$-$C_4$ alkyl acrylate, more preferentially methyl acrylate, ethyl acrylate, propyl acrylate, isobutyl acrylate, n-butyl acrylate, alkyl methacrylate, particularly $C_1$-$C_{10}$ alkyl methacrylate, preferentially $C_1$-$C_4$ alkyl methacrylate, more preferentially methyl methacrylate, ethyl methacrylate, propyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate and combinations thereof, preferably methyl acrylate, ethyl acrylate, isobutyl acrylate, n-butyl acrylate, methyl methacrylate, more preferentially methyl acrylate or ethyl acrylate.

The most preferred monomer (a2) according to the invention is chosen among methyl acrylate, ethyl acrylate, isobutyl acrylate, n-butyl acrylate, methyl methacrylate, more preferentially methyl acrylate or ethyl acrylate.

The copolymer A according to the invention is prepared by polymerisation of at least one hydrophobic monomer (a3) which is a hydrophobic associative monomer comprising at least ethoxylene groups and a hydrophobic end group. The hydrophobic end group is a straight, branched or cyclic, saturated, unsaturated or aromatic hydrocarbon group comprising from 6 to 40 carbon atoms.

Preferably for the hydrophobic monomer (a3) of formula (I) according to the invention, the sum m+n varies from 10 to 150, advantageously from 10 to 100, more advantageously from 10 to 60.

Preferably according to the invention, in represents an integer or decimal, advantageously an integer, greater than or equal to 10.

Preferably according to the invention, the value of m is strictly greater than the value of n. More preferably according to the invention, the numerical ratio m/n ranges from 100/0 to 70/30.

According to one variant, n is null and m independently represents an integer or decimal, advantageously an integer, ranging from 10 to 100, advantageously ranging from 10 to 60, more advantageously ranging from 20 to 60, even more advantageously ranging from 20 to 40.

According to another variant, each of n and m is different from 0. In particular, m and n, identical or different, independently represent an integer or decimal, advantageously an integer, ranging from 5 to 100, the sum m+n varying from 10 to 150, advantageously from 10 to 100, more advantageously from 10 to 60. Preferably according to the invention, the value of m is strictly greater than the value of n. More preferably according to the invention, the numerical ratio m/n ranges from 90/10 to 70/30.

More preferably according to the invention, n represents 0.

Preferably according to the invention, $R^1$ represents a group chosen among acrylate, methacrylate, acryl urethane, methacryl urethane, vinyl, allyl, methallyl, isoprenyl, an unsaturated urethane group, in particular acryl urethane, methacryl urethane, α-α'-dimethyl-isopropenyl-benzyl urethane, allyl urethane, more preferentially a group chosen among acrylate, methacrylate, acryl urethane, methacryl urethane, vinyl, allyl, methallyl and isoprenyl, even more preferentially a methacrylate group.

$R^2$ independently represents a hydrocarbon group comprising from 6 to 40 carbon atoms, preferably from 6 to 32 carbon atoms, more preferentially from 8 to 30 carbon atoms.

The hydrocarbon group may be straight, branched or cyclic, saturated, unsaturated or aromatic.

According to the invention, the hydrocarbon group $R^2$ advantageously represents a straight, branched or cyclic, advantageously straight or branched, alkyl or alkenyl group, comprising from 6 to 40 carbon atoms, preferentially from 6 to 32 carbon atoms.

Preferably according to the invention, the hydrocarbon group $R^2$ advantageously represents a straight alkyl or alkenyl group, comprising from 6 to 40 carbon atoms, preferentially from 6 to 32 carbon atoms, more preferentially from 8 to 30 carbon atoms. Preferably according to the invention, the hydrocarbon group $R^2$ advantageously represents a branched alkyl or alkenyl group, comprising from 6 to 40 carbon atoms, preferentially from 6 to 32 carbon atoms, more preferentially from 8 to 30 carbon atoms. Preferentially, the hydrocarbon group $R^2$ represents an alkyl group derived from a Guerbet alcohol, i.e., an alkyl group of formula (II):

wherein R' represents a $C_6$-$C_{40}$-alkyl group, preferably a $C_8$-$C_{32}$-alkyl group.

Preferably according to the invention, the hydrocarbon group $R^2$ advantageously represents a straight alkyl or alkenyl group, comprising from 6 to 40 carbon atoms, such as, for example, a cyclohexyl group. According to the invention, $R^2$ may also represent an alkyl group derived from an alcohol obtained by an oxo reaction.

According to the invention, the hydrocarbon group $R^2$ may also represent an aromatic group comprising from 6 to 40 carbon atoms, preferentially from 6 to 32 carbon atoms, more preferentially from 8 to 30 carbon atoms.

According to the invention, the hydrocarbon group $R^2$ may represent a radical of formula (III):

wherein R" represents a hydrocarbon group of formula $C_{15}H_{31-x}$ where x=0, 2, 4, 6, whereby it may thus comprise 0, 1, 2 or 3 ethylenic unsaturations (double bond). Such a radical of formula (III) is advantageously derived from cardanol, and is therefore bio-sourced in origin.

According to the invention, the hydrocarbon group $R^2$ may represent a group comprising from 2 to 5 phenyl groups, such as a tristyrylphenyl (TSP) group of formula:

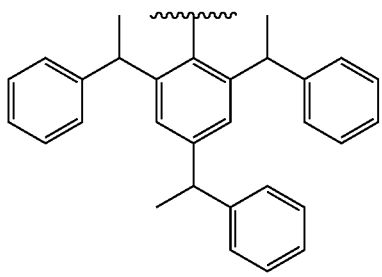 [SMILES: *c1c(C(C)c2ccccc2)cc(C(C)c2ccccc2)cc1C(C)c1ccccc1]

or a distyrylphenyl (DSP) group of formula:

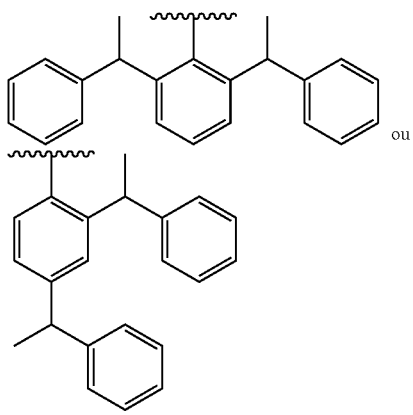

ou or a pentastyrylcumylphenyl group.

In particular, $R^2$ independently represents a straight, branched or cyclical, saturated, unsaturated or aromatic hydrocarbon group comprising from 6 to 40 carbon atoms, preferably a straight or branched $C_6$-$C_{40}$-alkyl group, preferably a straight or branched $C_3$-$C_{30}$ alkyl group, a $C_6$-$C_{40}$-aryl group, preferably a $C_8$-$C_{30}$-aryl group, preferentially comprising from 2 to 5 phenyl groups, for example a tristyrylphenyl group. According to the invention, the monomer (a4) is chosen among 2-acrylamido-2-methylpropane sulphonic acid, 2-sulphoethyl methacrylate, sodium methallyl sulphonate, styrene sulphonate, their salts and combinations thereof.

The preferred salts for monomer (a4) are sodium and ammonium salts.

Preferably according to the invention, the monomer (a4) is chosen among 2-acrylamido-2-methylpropane sulphonic acid, 2-sulphoethyl methacrylate, their salts and combinations thereof.

Preferably according to the invention, the monomer (a4) is 2-acrylamido-2-methylpropane sulphonic acid (AMPS) or one of its salts, preferably its sodium salt.

Preferably according to the invention, the copolymer A is prepared by polymerisation reaction of the monomers (a1-1), (a1-2), (a-2), (a-3) and (a-4), excluding any other monomer.

The proportions of the different monomers used in the preparation of the copolymer (A) can vary rather significantly.

Preferably according to the invention, copolymer A is prepared by polymerisation reaction:
of from 15 to 50% by weight, preferably from 20 to 45% by weight, relative to the total weight of the monomers, of monomer (a1-1) or
of from 0 to less than 15% by weight, preferably from 0 to 10% by weight, preferentially from 0 to 6% by weight, more preferentially from 0 to 5% by weight, even more preferentially from 0 to 2% by weight, even more preferentially from 0 to 1.5% by weight, relative to the total weight of the monomers, of monomer (a1-2) or
of from 35 to 60% by weight, preferably from 40 to 50% by weight, relative to the total weight of the monomers, of monomer (a2) or
of from 0.1 to 35% by weight, preferably from 0.1 to 20% by weight, relative to the total weight of the monomers, of hydrophobic monomer (a3) or
of from 0.5 to 10% by weight, preferably from 0.5 to 5% by weight, relative to the total weight of the monomers, of monomer (a4).

Particularly preferably according to the invention, the copolymer A is prepared by polymerisation reaction:
of from 15 to 50% by weight, preferably from 20 to 45% by weight, relative to the total weight of the monomers, of monomer (a1-1) and
of from 0 to less than 15% by weight, preferably from 0 to 10% by weight, preferentially from 0 to 6% by weight, more preferentially from 0 to 5% by weight, even more preferentially from 0 to 2% by weight, even more preferentially from 0 to 1.5% by weight, relative to the total weight of the monomers, of monomer (a1-2) and
of from 35 to 60% by weight, preferably from 40 to 50% by weight, relative to the total weight of the monomers, of monomer (a2) and
of from 0.1 to 35% by weight, preferably from 0.1 to 20% by weight, relative to the total weight of the monomers, of hydrophobic monomer (a3) and
of from 0.5 to 10% by weight, preferably from 0.5 to 5% by weight, relative to the total weight of the monomers, of monomer (a4).

In addition to the copolymer (A), the composition according to the invention comprises at least one binding polymer B chosen among:
a vinyl acetate homopolymer;
a vinyl acetate and ethylene copolymer, a vinyl acetate and acrylate copolymer, a vinyl acetate and methacrylate copolymer, a vinyl acetate, ethylene and acrylate copolymer, a vinyl acetate, ethylene and methacrylate copolymer, a vinyl acetate, acrylate and methacrylate copolymer;
a vinyl versatate homopolymer;
a vinyl versatate and ethylene copolymer, a vinyl versatate and acrylate copolymer, a vinyl versatate and methacrylate copolymer, a vinyl versatate, ethylene and acrylate copolymer, a vinyl versatate, ethylene and methacrylate copolymer, a vinyl versatate, acrylate and methacrylate copolymer;
a vinyl acetate and vinyl versatate copolymer, a vinyl acetate, vinyl versatate and ethylene copolymer, a vinyl acetate, vinyl versatate and acrylate copolymer, a vinyl acetate, vinyl versatate and methacrylate copolymer, a vinyl acetate, vinyl versatate, ethylene and acrylate copolymer, a vinyl acetate, vinyl versatate, ethylene and methacrylate copolymer, a vinyl acetate, vinyl versatate, ethylene, acrylate and methacrylate copolymer and
combinations thereof.

In addition to at least one of these monomers, the polymer B may therefore also be prepared by polymerisation of other monomers, in particular ethylene, acrylic acid esters, methacrylic acid esters and combinations thereof.

The acrylic acid ester is advantageously chosen among alkyl acrylate, in particular $C_1$-$C_{10}$-alkyl acrylate, preferentially $C_1$-$C_4$-alkyl acrylate, more preferentially methyl acrylate, ethyl acrylate, propyl acrylate, isobutyl acrylate, n-butyl acrylate.

The methacrylic acid ester is advantageously chosen among alkyl methacrylate, in particular $C_1$-$C_{10}$-alkyl methacrylate, preferentially $C_1$-$C_4$-alkyl methacrylate, more preferentially methyl methacrylate, ethyl methacrylate, propyl methacrylate, isobutyl methacrylate, n-butyl methacrylate.

These include, in particular, the vinyl acetate-ethylene copolymers, the vinyl acetate alkyl (meth)acrylate copolymers, the vinyl versatate alkyl (meth)acrylate copolymers, the vinyl acetate-vinyl versatate copolymers and combinations thereof.

The polymer B is advantageously in the form of an aqueous continuous-phase emulsion.

The composition according to the invention advantageously has a pH that is greater than 7, preferably greater than 8. Preferably, the composition according to the invention has a pH that ranges from 7 to 12, more preferentially from 8 to 12.

The composition may in particular be prepared by adding the copolymer A to an aqueous composition comprising polymer B, for example in an aqueous continuous-phase emulsion comprising polymer B.

The coating according to the invention is advantageously a varnish or a paint. The composition may also include, in addition to water, polymer A and polymer B:
at least one pigment D or
at least one filler E or
combinations thereof.

Pigment D may be an inorganic pigment, an organic pigment, or combinations thereof. Examples of inorganic pigments include in particular titanium dioxide, iron oxide (brown, yellow, red or black), zinc oxide, zinc phosphate and combinations thereof. Examples of organic pigments include in particular green phthalocyanine, blue phthalocyanine, blue indanthrone, beta-naphthol, benzimidazolone, pyranthrone, dicetopyrrolopyrrole (DPP), quinacridone, the azo pigments, in particular the condensation diazoics, carboazole dioxazine, perinone, pyrazolone, carbon black, graphite, anthraquinone, benzimidazolone, arylamide, diarylide, benzimidazolone, organic metal complexes, isoindolinone, isoindoline, quinophthalone, anthrapyrimidine, flavanthrone and combinations thereof.

Examples of fillers include in particular barium sulphate, natural calcium carbonate, synthetic calcium carbonate, clay, cristobalite, diatomaceous earth, dolomite, feldspath, kaolin, mica, silica (Quartz), aluminum silicate, calcium silicate, talc and combinations thereof.

Preferably according to the invention, the composition comprises:
from 0.5 to 5% by dry weight of copolymer A,
from 50 to 90% by dry weight of copolymer B and
from 9.5% to 44.5% by weight of water.

Such a composition advantageously corresponds to a varnish composition.

Preferably according to the invention, the composition comprises:
from 0.1 to 4% by dry weight of copolymer A,
from 5 to 20% by dry weight of copolymer B,
from 3 to 15% by dry weight of pigment D,
from 20 to 50% by dry weight of filler E and
from 11 to 71.9% by weight of water,
the total content of pigment D and filler E being strictly greater than 0. Such a composition advantageously corresponds to a paint composition.

The composition according to the invention may also comprise at least one admixture, in particular at least one admixture chosen among dispersing agents, anti-foaming agents, biocides, colouring agents, lubricants and optical brighteners.

The invention also provides a method of preparing the composition according to the invention. The preparation method according to the invention comprises the combination of at least one polymer A, at least one polymer B and water. Preferably according to the invention, polymer B is a water-based emulsion into which polymer A is introduced.

The invention also aims to use a copolymer A as defined according to the invention in an aqueous coating composition comprising at least one binding polymer B chosen among a vinyl acetate homopolymer, a vinyl acetate copolymer, a vinyl versatate homopolymer, a vinyl versatate copolymer and combinations thereof, to improve stability during storage.

The invention thus provides a method of preparing a coating using at least one composition according to the invention. The method of preparing a coating according to the invention comprises the application of at least one composition according to the invention to a substrate.

The invention also aims to use a copolymer A as defined according to the invention in an aqueous coating composition comprising at least one binding polymer B chosen among a vinyl acetate homopolymer, a vinyl acetate copolymer, a vinyl versatate homopolymer, a vinyl versatate copolymer and combinations thereof, to improve stability during storage.

The invention also relates to some of the A copolymers as such. Thus, the invention provides a particular copolymer AP prepared by polymerisation reaction:
of at least one monomer (a1-1) chosen among acrylic acid and salts thereof;
of from 0 to less than 15% by weight, relative to the total weight of the monomers, of a monomer (a1-2) chosen among methacrylic acid and salts thereof, and in a [monomer (a1-1)]/[monomer (a1-1)+monomer (a1-2)] weight ratio strictly greater than 0.65;
of at least one monomer (a2) that is an ester of an acid chosen among acrylic acid, methacrylic acid, itaconic acid and combinations thereof, preferably an ester of an acid chosen among acrylic acid and methacrylic acid;
of at least one hydrophobic monomer (a3) of formula (I):

$$R^1\text{-}(EO)_m\text{-}(PO)_n\text{-}R^2 \qquad (I)$$

wherein:
m and n, identical or different, independently represent 0 or an integer or decimal, advantageously an integer, less than 150, the sum m+n ranging from 5 to 150,
EO represents a $CH_2CH_2O$ group,
PO independently represents a group chosen among $CH(CH_3)CH_2O$ and $CH_2CH(CH_3)O$,
$R^1$ represents a group comprising at least one polymerisable olefin unsaturation,
$R^2$ independently represents a straight, branched or cyclic, saturated, unsaturated or aromatic hydrocarbon group comprising from 6 to 40 carbon atoms;
of at least one monomer (a4) chosen among 2-acrylamido-2-methylpropane sulphonic acid, 2-sulphoethyl methacrylate, sodium methallyl sulphonate, styrene sulphonate, their salts and combinations thereof.

The copolymer AP may also be prepared with from 0.1 to less than 15% by weight of monomer (a1-2) relative to the total weight of the monomers. Preferably, the copolymer AP is prepared with from 0.1 to less than 10% by weight of monomer (a1-2) relative to the total weight of the monomers. Also preferably, the copolymer AP is prepared with from 0.1 to less than 5% by weight of monomer (a1-2) relative to the total weight of the monomers. More preferably, the copolymer AP is prepared in the absence of a monomer (a1-2) chosen among methacrylic acid and salts thereof. Also preferably, the copolymer AP is prepared by polymerisation reaction:
- of acrylic acid or one of its salts;
- of an ester of an acid chosen among acrylic acid and methacrylic acid;
- of at least one hydrophobic monomer (a3) of formula (I);
- of 2-acrylamido-2-methylpropane sulphonic acid or one of its salts.

The particular, advantageous or preferred characteristics of the composition according to the invention define methods and uses according to the invention as well as copolymers AP that are also particular, advantageous or preferred, in particular the copolymers AP1, AP2 and AP3 according to the invention.

The invention provides a copolymer AP1 prepared by polymerisation reaction:
- of at least one monomer (a1-1) chosen among acrylic acid and salts thereof;
- of from 0 to less than 15% by weight, relative to the total weight of the monomers, of a monomer (a1-2) chosen among methacrylic acid and salts thereof, and in a [monomer (a1-1)]/[monomer (a1-1)+monomer (a1-2)] weight ratio strictly greater than 0.65;
- of at least one monomer (a2) that is an ester of an acid chosen among acrylic acid, methacrylic acid, itaconic acid and combinations thereof, preferably an ester of an acid chosen among acrylic acid and methacrylic acid;
- of at least one hydrophobic monomer (a3) of formula (I):

$$R^1\text{-}(EO)_m\text{-}(PO)_n\text{-}R^2 \quad (I)$$

wherein:
m and n, identical or different, independently represent 0 or an integer or decimal, advantageously an integer, less than 150, the sum m+n ranging from 5 to 150,
EO represents a $CH_2CH_2O$ group,
PO independently represents a group chosen among $CH(CH_3)CH_2O$ and $CH_2CH(CH_3)O$,
$R^1$ represents a group comprising at least one polymerisable olefin unsaturation,
$R^2$ independently represents a straight, branched or cyclic, saturated, unsaturated or aromatic hydrocarbon group comprising from 6 to 20 carbon atoms or a straight, branched or cyclic, saturated, unsaturated or aromatic hydrocarbon group comprising from 24 to 40 carbon atoms;
- of at least one monomer (a4) chosen among 2-acrylamido-2-methylpropane sulphonic acid, 2-sulphoethyl methacrylate, sodium methallyl sulphonate, styrene sulphonate, their salts and combinations thereof.

The invention also provides a copolymer AP2 prepared by polymerisation reaction:
- of at least one monomer (a1-1) chosen among acrylic acid and salts thereof;
- of from 0.1 to less than 15% by weight, relative to the total weight of the monomers, of a monomer (a1-2) chosen among methacrylic acid and salts thereof, and in a [monomer (a1-1)]/[monomer (a1-1)+monomer (a1-2)] weight ratio strictly greater than 0.65;
- of at least one monomer (a2) that is an ester of an acid chosen among acrylic acid, methacrylic acid, itaconic acid and combinations thereof, preferably an ester of an acid chosen among acrylic acid and methacrylic acid;
- of at least one hydrophobic monomer (a3) of formula (I):

$$R^1\text{-}(EO)_m\text{-}(PO)_n\text{-}R^2 \quad (I)$$

wherein:
m and n, identical or different, independently represent 0 or an integer or decimal, advantageously an integer, less than 150, the sum m+n ranging from 5 to 150,
EO represents a $CH_2CH_2O$ group,
PO independently represents a group chosen among $CH(CH_3)CH_2O$ and $CH_2CH(CH_3)O$,
$R^1$ represents a group comprising at least one polymerisable olefin unsaturation,
$R^2$ independently represents a straight, branched or cyclic, saturated, unsaturated or aromatic hydrocarbon group comprising from 6 to 40 carbon atoms;
- of at least one monomer (a4) chosen among 2-acrylamido-2-methylpropane sulphonic acid, 2-sulphoethyl methacrylate, sodium methallyl sulphonate, styrene sulphonate, their salts and combinations thereof.

The invention also provides a copolymer AP3 prepared by polymerisation reaction:
- of at least one monomer (a1-1) chosen among acrylic acid and salts thereof;
- of from 0 to less than 15% by weight, relative to the total weight of the monomers, of a monomer (a1-2) chosen among methacrylic acid and salts thereof, and in a [monomer (a1-1)]/[monomer (a1-1)+monomer (a1-2)] weight ratio strictly greater than 0.65;
- at least one monomer (a2) that is an ester of an acid chosen among methacrylic acid, itaconic acid and combinations thereof, preferably an ester of an acid chosen among acrylic acid and methacrylic acid;
- of at least one hydrophobic monomer (a3) of formula (I):

$$R^1\text{-}(EO)_m\text{-}(PO)_n\text{-}R^2 \quad (I)$$

wherein:
m and n, identical or different, independently represent 0 or an integer or decimal, advantageously an integer, less than 150, the sum m+n ranging from 5 to 150,
EO represents a $CH_2CH_2O$ group,
PO independently represents a group chosen among $CH(CH_3)CH_2O$ and $CH_2CH(CH_3)O$,
$R^1$ represents a group comprising at least one polymerisable olefin unsaturation,
$R^2$ independently represents a straight, branched or cyclic, saturated, unsaturated or aromatic hydrocarbon group comprising from 6 to 40 carbon atoms;
- of at least one monomer (a4) chosen among 2-acrylamido-2-methylpropane sulphonic acid, 2-sulphoethyl methacrylate, sodium methallyl sulphonate, styrene sulphonate, their salts and combinations thereof.

The following examples illustrate the various aspects of the invention, in particular the preparation and characterisation of A copolymer compositions according to the invention and of compositions according to the invention.

EXAMPLES

All of the synthesis reactions of copolymers (A) according to the invention or of the comparative copolymers were carried out in a cylindrical glass reactor with a usable volume of 1 litre equipped with a mechanical anchor stirring rod and oil bath heating. Stirring was maintained throughout the synthesis.

The solids content of the polymers synthesised by means of a microwave balance was measured.

The following monomers were used:
a1-1: Acrylic acid (AA),
a1-2: Methacrylic acid (MAA),
a2-1: Ethyl acrylate (EA),
a2-2: Butyl acrylate (BuA),
a3-a: a compound of formula (I) wherein $R^1$ represents a methacrylate group, $R^2$ represents a straight $C_{16-18}$-alkyl group, m=20 and n=0 (($C_{16-18}$)-$EO_{20}$-methacrylate),
a3-b: a compound of formula (I) wherein $R^1$ represents a methacrylate group, $R^2$ represents an aromatic tristyrylphenyl group, m=25 and n=0 ((TSP)-$EO_{25}$-methacrylate),
a3-c: a compound of formula (I) wherein $R^1$ represents a methacryl urethane group, $R^2$ represents an aromatic tristyrylphenyl group, m=25 and n=0 ((TSP-$EO_{25}$)-methacryl urethane),
a3-d: a compound of formula (I) wherein $R^1$ represents a methacrylate group, $R^2$ represents a branched $C_{16}$-alkyl group, m=25 and n=0 (($C_{16}$-$EO_{25}$-Guerbet alcohol methacrylate),
a3-e: a compound of formula (I) wherein $R^1$ represents a methacrylate group, $R^2$ represents a branched $C_{20}$-alkyl group, m=25 and n=0 (($C_{20}$-$EO_{25}$-Guerbet alcohol methacrylate),
a3-f: a compound of formula (I) wherein $R^1$ represents a methacrylate group, $R^2$ represents a $C_{12}$-alkyl oxo group, m=36 and n=0 (-oxo-$C_{12}$-$EO_{36}$-methacrylate),
a3-g: a compound of formula (I) wherein $R^1$ represents a methacrylate group, $R^2$ represents a straight $C_{22}$-alkyl group, m=25 and n=0 (($C_{22}$-$EO_{25}$-methacrylate),
a4: a 2-acrylamido-2-methylpropane sulphonic acid (AMPS) sodium salt.

Example 1: Preparation and Characterisation of Copolymers A According to the Invention Preparation and Characterisation of Copolymer (P1) According to the Invention In the reactor, place an initial load comprised of 474.56 g of deionised water, 6.46 g of sodium dodecyl sulphate and 5.41 g of tridecyl alcohol tri-ethoxylate (Rhodasurf ID030, Solvay).

In a first glass beaker, weigh 90.09 g of monomer (a1-1) according to the proportions listed in Table 1, 19.28 g of monomer (a1-2), 158.06 g of monomer (a2-1), 21.07 g of monomer (a3-b), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water. Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it.

A copolymer (P) is obtained at 29.9% by weight of solids content of which the composition is broken down in Table 1.

Preparation and Characterisation of Copolymer (P2) According to the Invention

In the reactor, place an initial load comprised of 474.56 g of deionised water, 6.46 g of sodium dodecyl sulphate and 5.41 g of tridecyl alcohol tri-ethoxylate (Rhodasurf ID030, Solvay).

In a first glass beaker, weigh 72.06 g of monomer (a1-1) according to the proportions listed in Table 1, 37.28 g of monomer (a1-2), 158.06 g of monomer (a2-1), 21.07 g of monomer (a3-b), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water. Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool and then filtering it.

A copolymer (P2) is obtained at 30.4% by weight of solids content, the composition of which is broken down in Table 1.

TABLE 1

| | Monomer (amount - % by weight) | | | |
|---|---|---|---|---|
| Polymer | (a1) | (a2) | (a3) | (a4) |
| P1 | a1-1 (30.94) a1-2 (6.62) | a2-1 (54.29) | a3-b (7.24) | AMPS (0.91) |
| P2 | a1-1 (24.75) a1-2 (12.81) | a2-1 (54.30) | a3-b (7.24) | AMPS (0.91) |

Example 2: Preparation and Characterisation of a Comparative Copolymer

Preparation and Characterisation of the Comparative Copolymer (CP1)

In the reactor, place an initial load comprised of 474.56 g of deionised water, 6.46 g of sodium dodecyl sulphate and 5.41 g of tridecyl alcohol tri-ethoxylate (Rhodasurf ID030, Solvay).

In a first glass beaker, weigh 109.34 g of monomer (a1-2) according to the proportions listed in Table 2, 158.06 g of monomer (a2-1), 21.07 g of monomer (a3-b), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water. Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool and then filtering it.

A copolymer (CP1) is obtained at 30.0% by weight of solids content of which the composition is broken down in Table 2.

TABLE 2

| Polymer | Monomer (amount - % by weight) | | | |
| --- | --- | --- | --- | --- |
| | (a1) | (a2) | (a3) | (a4) |
| CP1 | a1-2 (37.56) | a2-1 (54.30) | a3-b (7.24) | AMPS (0.91) |

Example 3: Preparation and Characterisation of Paint Compositions According to the Invention and Comparative Paint Compositions Prepare a paint composition comprising:

$CaCO_3$ as a filler and a vinyl acetate-ethylene copolymer emulsion in water as binder B: Mowilith LDM 1871 (vinyl versatate and ethylene copolymer at 53% by weight of solids content and pH of 4.5, Celanese), with a solids content (130° C.; 30 min) of 59-61% by weight.

To this paint, add 0.27% by dry weight of a copolymer according to the invention or of a comparative copolymer.

The final paint has a solids content of 72% by weight.

The composition of the paint is shown in Table 3.

TABLE 3

| | % by weight relative to total weight |
| --- | --- |
| Water | Qsp 100% |
| NaOH 20% | 0.4 |
| Dispersant (Ecodis 40) | 0.4 |
| Biocide (MBS Acticide) | 0.2 |
| Anti-foaming agent (Tego 901 W) | 0.2 |
| Pigment (Tiona 568) | 8.1 |
| Filler (Omyacarb 2 AV) | 13.3 |
| Filler (Omyacoat 850 OG) | 30 |
| Binder B (Mowilith LDM 1871) | 15 |
| Pigment (Tego 825) | 0.2 |
| Copolymer A according to the invention or comparative (dry weight) | 0.27 |

Prepare a paint composition according to the invention (C1) comprising the polymer (P1). Similarly, prepare a paint composition according to the invention (C2) comprising the polymer (P2) and a comparative paint composition (CC1) comprising the polymer (CP1).

The Brookield (mPa·s) viscosities are measured at 10 rpm and at 100 rpm at 25° C. using an analogue viscometer:

after storage for 24 hours at 25° C. and after storage for 1 week at 50° C.

For each paint composition, the viscosity drift is determined according to the following formula:

$$D = \frac{(\mu_1 - \mu_{24})}{\mu_{24}} \times 100$$

wherein:

D represents the viscosity drift in %, $\mu_1$ represents the Brookfield viscosity of the paint after storage for 1 week at 50° C. and $\mu_{24}$ represents the Brookfield viscosity of the paint after storage for 24 hours at 25° C.

The viscosity drift, which is positive if the viscosity increases over time or negative if the viscosity decreases over time, should be as close to zero as possible. The results of the viscosity measurements after 24 hours and the drift values are shown in Table 4.

TABLE 4

| Composition | CC1 | C1 | C2 |
| --- | --- | --- | --- |
| Polymer tested | CP1 | P1 | P2 |
| Viscosity at 10 rpm | 30,200 | 26,800 | 29,700 |
| Drift at 10 rpm | 62 | 18 | 24 |
| Viscosity at 100 rpm | 4,120 | / | 3,920 |
| Drift at 100 rpm | 40 | 12 | 17 |

It can be seen that the paint compositions according to the invention (C1 and C2) comprising, respectively, polymers A (P1) and (P2) are much more stable than the comparative composition (CC1) which comprises a comparative copolymer (CP1) that does not comprise a unit derived from acrylic acid.

Example 4: Preparation and Characterisation of Copolymers a According to the Invention Preparation and Characterisation of Copolymer (P3) According to the Invention In the reactor, place an initial load comprised of 474.56 g of deionised water, 6.46 g of sodium dodecyl sulphate and 5.41 g of tridecyl alcohol tri-ethoxylate (Rhodasurf ID030, Solvay).

In a first glass beaker, weigh 94.57 g of monomer (a1-1) according to the proportions listed in Table 1, 14.73 g of monomer (a1-2), 158.06 g of monomer (a2-1), 21.05 g of monomer (a3-a), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it.

A copolymer (P3) is obtained at 30.4% by weight of solids content of which the composition is broken down in Table 5.

Preparation and Characterisation of Copolymer (P4) According to the Invention

In the reactor, place an initial load comprised of 474.56 g of deionised water, 6.46 g of sodium dodecyl sulphate and 5.41 g of tridecyl alcohol tri-ethoxylate (Rhodasurf ID030, Solvay).

In a first glass beaker, weigh 75.66 g of monomer (a1-1) according to the proportions listed in Table 1, 33.65 g of monomer (a1-2), 158.06 g of monomer (a2-1), 21.05 g of monomer (a3-a), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it.

A copolymer (P4) is obtained at 30.1% by weight of solids content of which the composition is broken down in Table 5.

Preparation and Characterisation of Copolymer (P5) According to the Invention

In the reactor, place an initial load comprised of 455.33 g of deionised water, 6.44 g of sodium dodecyl sulphate and 5.38 g of tridecyl alcohol tri-ethoxylate (Rhodasurf ID030, Solvay).

In a first glass beaker, weigh 110.00 g of monomer (a1-1) according to the proportions listed in Table 1, 10.01 g of monomer (a1-2), 140.00 g of monomer (a2-1), 10.00 g of monomer (a2-2), 14.30 g of monomer (a3-a), 0.07 g of dodecylmercaptan, 2.27 g of sodium dodecyl sulphate and 171.88 g of deionised water.

In a second glass beaker, weigh 1.365 g of ammonium persulphate and then dissolve it in 5 g of deionised water.

In a third glass beaker, weigh 0.136 g of sodium metabisulphite and then dissolve it in 5 g of deionised water.

In a fourth container, such as a disposable syringe, weigh 5.29 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.110 g of ammonium persulphate dissolved in 14 g of deionised water into the reactor in 1 hour.

Then, bake for 1 hour before allowing the medium to cool then filter it.

A copolymer (P5) is obtained at 29.5% by weight of solids content of which the composition is broken down in Table 5.

Preparation and Characterisation of Copolymer (P6) According to the Invention

In the reactor, place an initial load comprised of 474.56 g of deionised water and 6.46 g of sodium dodecyl sulphate.

In a first glass beaker, weigh 123.15 g of monomer (a1-1) according to the proportions listed in Table 1, 129.00 g of monomer (a2-1), 21.98 g of monomer (a3-c), 0.07 g of dodecylmercaptan, 2.26 g of sodium dodecyl sulphate and 125.94 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it.

A copolymer (P6) is obtained at 28.8% by weight of solids content of which the composition is broken down in Table 5.

Preparation and Characterisation of Copolymer (P7) According to the Invention

In the reactor, place an initial load comprised of 474.56 g of deionised water, 6.46 g of sodium dodecyl sulphate and 5.41 g of tridecyl alcohol tri-ethoxylate (Rhodasurf ID030, Solvay).

In a first glass beaker, weigh 89.22 g of monomer (a1-1) according to the proportions listed in Table 1, 20.12 g of monomer (a1-2), 158.06 g of monomer (a2-1), 21.05 g of monomer (a3-d), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it.

A copolymer (P7) is obtained at 29.5% by weight of solids content of which the composition is broken down in Table 5.

Preparation and Characterisation of Copolymer (P8) According to the Invention

In the reactor, place an initial load comprised of 474.5 g of deionised water, 6.46 g of sodium dodecyl sulphate and 5.41 g of tridecyl alcohol tri-ethoxylate (Rhodasurf ID030, Solvay).

In a first glass beaker, weigh 123.17 g of monomer (a1-1) according to the proportions listed in Table 1, 1.35 g of monomer (a1-2), 129 g of monomer (a2-1), 6.36 g of monomer (a3-d), 0.07 g of dodecylmercaptan, 2.26 g of sodium dodecyl sulphate and 140.68 g of deionised water.

In a second glass beaker, weigh 0.92 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it. A copolymer (P8) is obtained at 28.3% by weight of solids content of which the composition is broken down in Table 5.

Preparation and Characterisation of Copolymer (P9) According to the Invention

In the reactor, place an initial load comprised of 474 g of deionised water and 6.46 g of sodium dodecyl sulphate.

In a first glass beaker, weigh 129.71 g of monomer (a1-1) according to the proportions listed in Table 1, 1.35 g of monomer (a1-2), 119.9 g of monomer (a2-1), 21.04 g of monomer (a3-d), 0.07 g of dodecylmercaptan, 2.26 g of sodium dodecyl sulphate and 140.68 g of deionised water.

In a second glass beaker, weigh 0.92 g of ammonium persulphate and then dissolve it in 5 g of deionised water.

In a third glass beaker, weigh 0.092 g of sodium meta-bisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.25 g of ammonium persulphate dissolved in 20 g of deionised water in 1 hour.

Then, bake for 1 hour at 80° C. before allowing the medium to cool then filter it.

A copolymer (P9) is obtained at 28.3% by weight of solids content of which the composition is broken down in Table 5.

Preparation and Characterisation of Copolymer (P10) According to the Invention

In the reactor, place an initial load comprised of 475 g of deionised water and 6.46 g of sodium dodecyl sulphate.

In a first glass beaker, weigh 116.62 g of monomer (a1-1) according to the proportions listed in Table 1, 1.35 g of monomer (a1-2), 138.1 g of monomer (a2-1), 21.04 g of monomer (a3-d), 0.07 g of dodecylmercaptan, 2.26 g of sodium dodecyl sulphate and 140.68 g of deionised water.

In a second glass beaker, weigh 0.92 g of ammonium persulphate and then dissolve it in 5 g of deionised water.

In a third glass beaker, weigh 0.092 g of sodium meta-bisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.25 g of ammonium persulphate dissolved in 20 g of deionised water in 1 hour.

Then, bake for 1 hour at 80° C. before allowing the medium to cool then filter it.

A copolymer (P10) is obtained at 28.3% by weight of solids content of which the composition is broken down in Table 5.

Preparation and Characterisation of Copolymer (P11) According to the Invention

In the reactor, place an initial load comprised of 475 g of deionised water and 6.46 g of sodium dodecyl sulphate.

In a first glass beaker, weigh 125.45 g of monomer (a1-1) according to the proportions listed in Table 1, 1.05 g of monomer (a1-2), 131.6 g of monomer (a2-1), 16.57 g of monomer (a3-d), 0.07 g of dodecylmercaptan, 2.26 g of sodium dodecyl sulphate and 140.23 g of deionised water.

In a second glass beaker, weigh 0.92 g of ammonium persulphate and then dissolve it in 5 g of deionised water.

In a third glass beaker, weigh 0.092 g of sodium meta-bisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.25 g of ammonium persulphate dissolved in 20 g of deionised water in 1 hour.

Then, bake for 1 hour at 80° C. before allowing the medium to cool then filter it.

A copolymer (P11) is obtained at 28.2% by weight of solids content of which the composition is broken down in Table 5.

Preparation and Characterisation of Copolymer (P12) According to the Invention

In the reactor, place an initial load comprised of 475 g of deionised water and 6.46 g of sodium dodecyl sulphate.

In a first glass beaker, weigh 120.61 g of monomer (a1-1) according to the proportions listed in Table 1, 1.64 g of monomer (a1-2), 126.7 g of monomer (a2-1), 25.59 g of monomer (a3-d), 0.07 g of dodecylmercaptan, 2.26 g of sodium dodecyl sulphate and 141.13 g of deionised water.

In a second glass beaker, weigh 0.92 g of ammonium persulphate and then dissolve it in 5 g of deionised water.

In a third glass beaker, weigh 0.092 g of sodium meta-bisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.25 g of ammonium persulphate dissolved in 20 g of deionised water in 1 hour.

Then, bake for 1 hour at 80° C. before allowing the medium to cool then filter it.

A copolymer (P12) is obtained at 28.2% by weight of solids content of which the composition is broken down in Table 5.

Preparation and Characterisation of Copolymer (P13) According to the Invention

In the reactor, place an initial load comprised of 464.64 g of deionised water, 6.47 g of sodium dodecyl sulphate and 5.38 g of tridecyl alcohol tri-ethoxylate (Rhodasurf ID030, Solvay).

In a first glass beaker, weigh 70.32 g of monomer (a1-1) according to the proportions listed in Table 1, 20.87 g of monomer (a1-2), 127 g of monomer (a2-1), 23.03 g of monomer (a3-e), 2.26 g of sodium dodecyl sulphate and 136.54 g of deionised water.

In a second glass beaker, weigh 1.37 g of ammonium persulphate and then dissolve it in 5 g of deionised water.

In a third glass beaker, weigh 0.136 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 30 minutes at a temperature of 76° C.±2° C. After 2 hours and 5 minutes, inject 4.57 g of EDMA.

Then, inject 0.099 g of ammonium persulphate dissolved in 20 g of deionised water into the reactor in 1 hour.

Then, bake for 1 hour at 85° C. before allowing the medium to cool then filter it.

A copolymer (P13) is obtained at 27.2% by weight of solids content of which the composition is broken down in Table 5.

Preparation and Characterisation of Copolymer (P14) According to the Invention

In the reactor, place an initial load comprised of 475 g of deionised water, 4.43 g of sodium dodecyl sulphate and 4.22 g of tridecyl alcohol tri-ethoxylate (Rhodasurf ID030, Solvay).

In a first glass beaker, weigh 76.19 g of monomer (a1-1) according to the proportions listed in Table 1, 18.24 g of monomer (a1-2), 128 g of monomer (a2-1), 26.05 g of monomer (a3-f), 7.85 g of $C_{16}$-$EO_{25}$ Guerbet alcohol, 1.55 g of sodium dodecyl sulphate and 124.12 g of deionised water.

In a second glass beaker, weigh 1.365 g of ammonium persulphate and then dissolve it in 5 g of deionised water.

In a third glass beaker, weigh 0.136 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.100 g of ammonium persulphate dissolved in 20 g of deionised water into the reactor in 1 hour.

Then, bake for 1 hour at 85° C. before allowing the medium to cool then filter it.

A copolymer (P14) is obtained at 28.6% by weight of solids content of which the composition is broken down in Table 5.

Preparation and Characterisation of Copolymer (P15) According to the Invention

In the reactor, place an initial load comprised of 468.9 g of deionised water, 6.42 g of sodium dodecyl sulphate and 5.33 g of tridecyl alcohol tri-ethoxylate (Rhodasurf ID030, Solvay).

In a first glass beaker, weigh 79.4 g of monomer (a1-1) according to the proportions listed in Table 1, 16.52 g of monomer (a1-2), 129 g of monomer (a2-1), 23.6 g of monomer (a3-g), 2.26 g of sodium dodecyl sulphate and 178.38 g of deionised water.

In a second glass beaker, weigh 1.365 g of ammonium persulphate and then dissolve it in 5 g of deionised water.

In a third glass beaker, weigh 0.136 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.097 g of ammonium persulphate dissolved in 15 g of deionised water into the reactor in 1 hour.

Then, bake for 1 hour at 85° C. before allowing the medium to cool then filter it.

A copolymer (P15) is obtained at 26.5% by weight of solids content of which the composition is broken down in Table 5.

TABLE 5

| Polymer | Monomer (amount - % by weight) | | | |
| --- | --- | --- | --- | --- |
| | (a1) | (a2) | (a3) | (a4) |
| P3 | a1-1 (32.49)<br>a1-2 (5.06) | a2-1 (54.31) | a3-a (7.23) | AMPS (0.91) |
| P4 | a1-1 (25.99)<br>a1-2 (11.56) | a2-1 (54.30) | a3-a (7.23) | AMPS (0.91) |
| P5 | a1-1 (38.33)<br>a1-2 (3.49) | a2-1 (48.79)<br>a2-2 (3.48) | a3-a (4.98) | AMPS (0.92) |
| P6 | a1-1 (44.50) | a2-1 (46.61) | a3-c (7.94) | AMPS (0.95) |
| P7 | a1-1 (30.65)<br>a1-2 (6.91) | a2-1 (54.30) | a3-d (7.23) | AMPS (0.91) |
| P8 | a1-1 (44.43)<br>a1-2 (0.49) | a2-1 (46.54) | a3-d (7.59) | AMPS (0.95) |
| P9 | a1-1 (47.23)<br>a1-2 (0.49) | a2-1 (43.66) | a3-d (7.66) | AMPS (0.96) |
| P10 | a1-1 (41.69)<br>a1-2 (0.48) | a2-1 49.37) | a3-d (7.52) | AMPS (0.94) |
| P11 | a1-1 (45.26)<br>a1-2 (0.38) | a2-1 (47.47) | a3-d (5.94) | AMPS (0.95) |
| P12 | a1-1 (43.51)<br>a1-2 (0.59) | a2-1 (45.72) | a3-d (9.23) | AMPS (0.95) |
| P13 | a1-1 (28.84)<br>a1-2 (8.56) | a2-1 (52.08) | a3-e (9.44) | AMPS (1.08) |
| P14 | a1-1 (30.34)<br>a1-2 (7.26) | a2-1 (50.97) | a3-f (10.37) | AMPS (1.06) |
| P15 | a1-1 (31.61)<br>a1-2 (6.58) | a2-1 (51.36) | a3-g (9.40) | AMPS (1.05) |

Example 5: Preparation and Characterisation of Comparative Copolymers

Preparation and Characterisation of the Comparative Copolymer (CP2)

In the reactor, place an initial load comprised of 474.56 g of deionised water and 6.46 g of sodium dodecyl sulphate.

In a first glass beaker, weigh 109.36 g of monomer (a1-2) according to the proportions shown in Table 6, 158.06 g of monomer (a2-1), 21.05 g of monomer (a3-d), 0.07 g of dodecylmercaptan, 2.26 g of sodium dodecyl sulphate and 138.57 g of deionised water.

In a second glass beaker, weigh 0.917 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.27 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.101 g of ammonium persulphate dissolved in 14 g of deionised water into the reactor.

Then, bake for 1 hour before allowing the medium to cool then filter it.

A copolymer (CP2) is obtained at 30.0% by weight of solids content of which the composition is broken down in Table 6.

Preparation and Characterisation of the Comparative Copolymer (CP3)

In the reactor, place an initial load comprised of 474.5 g of deionised water and 6.46 g of sodium dodecyl sulphate.

In a first glass beaker, weigh 49.81 g of monomer (a1-1) according to the proportions listed in Table 6, 74.71 g of monomer (a1-2), 129 g of monomer (a2-1), 21.04 g of monomer (a3-d), 2.26 g of sodium dodecyl sulphate and 140.68 g of deionised water.

In a second glass beaker, weigh 0.92 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.100 g of ammonium persulphate dissolved in 15 g of deionised water into the reactor.

Then, bake for 1 hour at 80° C. before allowing the medium to cool then filter it.

A copolymer (CP3) is obtained at 28.1% by weight of solids content of which the composition is broken down in Table 6.

Preparation and Characterisation of the Comparative Copolymer (CP4)

In the reactor, place an initial load comprised of 474.5 g of deionised water and 6.46 g of sodium dodecyl sulphate.

In a first glass beaker, weigh 27.47 g of monomer (a1-1) according to the proportions listed in Table 6, 97.05 g of monomer (a1-2), 129 g of monomer (a2-1), 21.04 g of monomer (a3-d), 2.26 g of sodium dodecyl sulphate and 140.68 g of deionised water.

In a second glass beaker, weigh 0.92 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.100 g of ammonium persulphate dissolved in 15 g of deionised water into the reactor.

Then, bake for 1 hour at 80° C. before allowing the medium to cool then filter it.

A copolymer (CP4) is obtained at 29.4% by weight of solids content of which the composition is broken down in Table 6.

Preparation and Characterisation of the Comparative Copolymer (CP5)

In the reactor, place an initial load comprised of 474.5 g of deionised water and 6.46 g of sodium dodecyl sulphate.

In a first glass beaker, weigh 73.36 g of monomer (a1-1) according to the proportions listed in Table 6, 51.16 g of monomer (a1-2), 129 g of monomer (a2-1), 21.04 g of monomer (a3-d), 2.26 g of sodium dodecyl sulphate and 140.68 g of deionised water.

In a second glass beaker, weigh 0.92 g of ammonium persulphate and then dissolve it in 5 g of deionised water.

In a third glass beaker, weigh 0.092 g of sodium metabisulphite and then dissolve it in 5 g of deionised water.

In a fourth container, such as a disposable syringe, weigh 5.41 g of 2-acrylamido-2-methylpropane sulphonic acid sodium salt (a4) at 50% by weight in water.

Heat the reactor content to 76° C.±2° C.

Inject the reagents from the 4 containers into the polymerisation reactor in 2 hours and 15 minutes at a temperature of 76° C.±2° C.

Then, inject 0.100 g of ammonium persulphate dissolved in 15 g of deionised water into the reactor.

Then, bake for 1 hour at 80° C. before allowing the medium to cool then filter it.

A copolymer (CP5) is obtained at 29.1% by weight of solids content of which the composition is broken down in Table 6.

TABLE 6

| Polymer | Monomer (amount - % by weight) | | | |
| --- | --- | --- | --- | --- |
| | (a1) | (a2) | (a3) | (a4) |
| CP2 | a1-2 (37.56) | a2-1 (54.29) | a3-d (7.25) | AMPS (0.91) |
| CP3 | a1-1 (17.97) a1-2 (26.95) | a2-1 (46.54) | a3-d (7.59) | AMPS (0.95) |
| CP4 | a1-1 (9.91) a1-2 (35.01) | a2-1 (46.54) | a3-d (7.59) | AMPS (0.95) |
| CP5 | a1-1 (26.46) a1-2 (18.46) | a2-1 (46.54) | a3-d (7.59) | AMPS (0.95) |

Example 6: Preparation and Characterisation of Paint Compositions According to the Invention and Comparative Paint Compositions Similar to example 3, prepare paint compositions according to the invention (C3 to C7) comprising, respectively, the polymers (P8 to P12) as well as comparative paint compositions (CC2 to CC5) comprising, respectively, the comparative polymers (CP2 to CP5).

Then, measure the Brookfield viscosities (mPa·s) at 10 rpm and 100 rpm according to the conditions in Example 3.

For each paint composition, the viscosity drift is determined according to the formula in example 3. The results of viscosity measurements after 24 hours and the drift values are shown in Table 7.

TABLE 7

| Composition | CC2 | CC3 | CC4 | CC5 | C3 | C4 | C5 | C6 | C7 |
| --- | --- | --- | --- | --- | --- | --- | --- | --- | --- |
| Polymer tested | CP2 | CP3 | CP4 | CP5 | P8 | P9 | P10 | P11 | P12 |
| Viscosity at 10 rpm | 19,600 | 19,600 | 24,900 | 23,400 | 15,400 | 16,800 | 17,700 | 15,800 | 19,600 |

TABLE 7-continued

| Composition | CC2 | CC3 | CC4 | CC5 | C3 | C4 | C5 | C6 | C7 |
|---|---|---|---|---|---|---|---|---|---|
| Drift at 10 rpm | 155 | −14 | −20 | −15 | −5 | −7 | 4 | −5 | −8 |
| Viscosity at 100 rpm | 5,400 | 4,600 | 6,130 | 5,750 | 3,450 | 4,000 | 4,460 | 3,720 | 5,000 |
| Drift at 100 rpm | 85 | −31 | −14 | −32 | −8 | −8 | 5 | −4 | −6 |

Again, it can be seen that the paint compositions according to the invention (C3 to C7) comprising, respectively, polymers A (P8 to P12) are much more stable than the comparative composition (CC2) which comprises a comparative copolymer that does not comprise a unit derived from acrylic acid.

In addition, the paint compositions according to the invention (C3 to C7) are much more stable than the comparative paint compositions (CC3 to CC5) comprising, respectively, a comparative copolymer (CP3 to CP5) wherein the [monomer (a1-1)]/[monomer (a1-1)+monomer (a1-2)] weight ratio is less than 0.65.

The invention claimed is:

1. A composition suitable for preparing a coating, the composition comprising:
   (A) a copolymer prepared by polymerizing a reaction mixture comprising:
      (a1-1) a first monomer comprising acrylic acid and/or an acrylate salt;
      (a1-2) a second monomer comprising a methacrylic acid and/or a methacrylate salt, in a range of from 0 to less than 15 wt. %, relative to the total monomer weight, and in an (a1-1)/((a1-1)+(a1-2)) weight ratio of greater than 0.65;
      (a2) a third monomer comprising an ester of an acid, the acid being acrylic acid, methacrylic acid, and/or itaconic acid;
      (a3) a hydrophobic monomer of formula (I):

$$R^1\text{-}(EO)_m\text{-}(PO)_n\text{-}R^2 \qquad (I),$$

wherein
   m and n are independently 0 or an integer or decimal less than 150, a sum of m and n being in a range of from 5 to 150,
   EO is $CH_2CH_2O$,
   PO is $CH(CH_3)CH_2O$ and/or $CH_2CH(CH_3)O$,
   $R^1$ is independently a group comprising a polymerizable olefin unsaturation, and
   $R^2$ is independently a straight, branched, cyclic, saturated, unsaturated, or aromatic hydrocarbon group comprising from 6 to 40 carbon atoms; and
      (a4) a fourth monomer comprising an 2-acrylamido-2-methylpropane sulfonic acid, 2-sulfoethyl methacrylate, sodium methallyl sulfonate, and/or styrene sulfonate, optionally in salt form;
   (B) a binding polymer comprising a vinyl acetate homopolymer, a vinyl acetate copolymer, a vinyl versatate homopolymer, and/or a vinyl versatate copolymer/
   (C) water;
   (D) a pigment; and
   (E) a filler E,
   wherein the copolymer (A) is present in the composition in a range of from 0.1 to 4 wt. % dry,
   wherein the binding polymer (B) is present in the composition in a range of from 5 to 20 wt. % dry,
   wherein the pigment (D) is present in the composition in a range of from 3 to 15 wt. % dry,
   wherein the filler (E) is present in the composition in a range of from 20 to 50 wt. % dry, and
   wherein the water (C) is present in the composition in a range of from 11 to 71.9 wt. %.

2. The composition of claim 1, wherein the (a1-1)/((a1-1)+(a1-2)) weight ratio is greater than 0.70.

3. The composition of claim 1, wherein the third monomer (a2) comprises alkyl acrylate, alkyl methacrylate, aryl acrylate, and/or aryl methacrylate.

4. The composition of claim 1, wherein the third monomer (a2) comprises methyl acrylate, ethyl acrylate, propyl acrylate, isobutyl acrylate, n-butyl acrylate, methyl methacrylate, ethyl methacrylate, propyl methacrylate, isobutyl methacrylate, n-butyl methacrylate, phenyl acrylate, benzyl acrylate, phenoxyethyl acrylate, phenyl methacrylate, benzyl methacrylate, and/or phenoxyethyl methacrylate.

5. The composition of claim 1, wherein the third monomer (a2) comprises methyl acrylate.

6. The composition of claim 1, wherein the third monomer (a2) comprises ethyl acrylate.

7. The composition of claim 1, wherein, in the hydrophobic monomer (a3), m is an integer or decimal in a range of from 20 to 40 and n is 0,
   $R^1$ is acrylate, methacrylate, acryl urethane, methacryl urethane, vinyl, allyl, methallyl, or isoprenyl group, and
   $R^2$ is a straight or branched $C_6$-$C_{40}$-alkyl group, or a $C_6$-$C_{40}$-aryl group.

8. The composition of claim 1, wherein the fourth monomer (a4) is 2-acrylamido-2-methylpropane sulfonic acid or a salt thereof.

9. The composition of claim 1, wherein the polymerizing for preparing the copolymer (A) comprises less than 10 wt. % of the second monomer (a1-2), relative to total monomer weight of the copolymer A.

10. The composition of claim 1, wherein the polymerizing for preparing the copolymer (A) does not comprise the second monomer (a1-2).

11. The composition of claim 1, wherein the polymerizing comprises, relative to a total weight, the second monomer (a1-2) in a range of from more than 0 to less than 15 wt. %.

12. The composition of claim 1, wherein the polymerizing comprises, relative to a total weight:
   the first monomer (a1-1) in a range of from 15 to 50 wt. %; and
   the third monomer (a2) in a range of from 35 to 60 wt. %.

13. The composition of claim 1, wherein the polymerizing comprises, relative to a total weight:
   the first monomer (a1-1) in a range of from 15 to 50 wt. %;
   the third monomer (a2) in a range of from 35 to 60 wt. %; and
   the hydrophobic monomer (a3) in a range of from 0.1 to 35 wt. %.

14. The composition of claim 1, wherein the polymerizing comprises, relative to a total weight:
the first monomer (a1-1) in a range of from 15 to 50 wt. %; or
the third monomer (a2) in a range of from 35 to 60 wt. %; or
the hydrophobic monomer (a3) in a range of from 0.1 to 35 wt. %; or
the fourth monomer (a4) in a range of from 0.5 to 10 wt. %.

15. The composition of claim 1, wherein the polymerizing comprises, relative to a total weight:
the first monomer (a1-1) in a range of from 15 to 50 wt. %;
the third monomer (a2) in a range of from 35 to 60 wt. %;
the hydrophobic monomer (a3) in a range of from 0.1 to 35 wt. %; and
the fourth monomer (a4) in a range of from 0.5 to 10 wt. %.

16. The composition of claim 1, wherein the binding polymer (B) comprises
a vinyl acetate homopolymer,
a vinyl acetate and ethylene copolymer,
a vinyl acetate and acrylate copolymer,
a vinyl acetate and methacrylate copolymer,
a vinyl acetate, ethylene, and acrylate copolymer,
a vinyl acetate, ethylene, and methacrylate copolymer,
a vinyl acetate, acrylate, and methacrylate copolymer,
a vinyl versatate homopolymer,
a vinyl versatate and ethylene copolymer,
a vinyl versatate and acrylate copolymer,
a vinyl versatate and methacrylate copolymer,
a vinyl versatate, ethylene, and acrylate copolymer,
a vinyl versatate, ethylene, and methacrylate copolymer,
a vinyl versatate, acrylate, and methacrylate copolymer,
a vinyl acetate and vinyl versatate copolymer,
a vinyl acetate, vinyl versatate, and ethylene copolymer,
a vinyl acetate, vinyl versatate, and acrylate copolymer,
a vinyl acetate, vinyl versatate, and methacrylate copolymer,
a vinyl acetate, vinyl versatate, ethylene, and acrylate copolymer,
a vinyl acetate, vinyl versatate, ethylene, and methacrylate copolymer, and/or
a vinyl acetate, vinyl versatate, ethylene, acrylate, and methacrylate copolymer.

17. The composition of claim 1, further comprising:
a dispersing agent, an anti-foaming agent, a biocide, a coloring agent, a lubricant, and/or an optical brightener.

18. The composition of claim 1, having a pH of greater than 7.

19. A composition suitable for preparing a coating, the composition comprising:
(A) a copolymer prepared by polymerizing a reaction mixture comprising:
(a1-1) a first monomer comprising acrylic acid and/or an acrylate salt;
(a1-2) a second monomer comprising a methacrylic acid and/or a methacrylate salt, in a range of from 0 to less than 15 wt. %, relative to the total monomer weight, and in an (a1-1)/((a1-1)+(a1-2)) weight ratio of greater than 0.65;
(a2) a third monomer comprising an ester of an acid, the acid being acrylic acid, methacrylic acid, and/or itaconic acid;
(a3) a hydrophobic monomer of formula (I):

$$R^1\text{-(EO)}_m\text{-(PO)}_n\text{-}R^2 \qquad (I),$$

wherein
m and n are independently 0 or an integer or decimal less than 150, a sum of m and n being in a range of from 5 to 150,
EO is $CH_2CH_2O$,
PO is $CH(CH_3)CH_2O$ and/or $CH_2CH(CH_3)O$,
$R^1$ is independently a group comprising a polymerizable olefin unsaturation, and
$R^2$ is independently a straight, branched, cyclic, saturated, unsaturated, or aromatic hydrocarbon group comprising from 6 to 40 carbon atoms; and
(a4) a fourth monomer comprising an 2-acrylamido-2-methylpropane sulfonic acid, 2-sulfoethyl methacrylate, sodium methallyl sulfonate, and/or styrene sulfonate, optionally in salt form;
(B) a binding polymer comprising a vinyl acetate homopolymer, a vinyl acetate copolymer, a vinyl versatate homopolymer, and/or a vinyl versatate copolymer; and
(C) water,
wherein the copolymer (A) is present in the composition in a range of from 0.5 to 5 wt. % dry,
wherein the binding polymer (B) is present in the composition in a range of from 50 to 90 wt. % dry, and
wherein the water (C) is present in the composition in a range of from 9.5 to 44.5 wt. %.

20. A method of preparing a coating, comprising:
applying the composition of claim 1 to a substrate.

* * * * *